US006998796B2

(12) United States Patent
Sears

(10) Patent No.: US 6,998,796 B2
(45) Date of Patent: Feb. 14, 2006

(54) FLUORESCENT LAMP BALLAST CONTROL CIRCUIT

(75) Inventor: Storm S. Sears, Dayton, NV (US)

(73) Assignee: Bruce Industries, Inc., Dayton, NV (US)

( * ) Notice: Subject to any disclaimer, the term of this patent is extended or adjusted under 35 U.S.C. 154(b) by 24 days.

(21) Appl. No.: 10/640,533

(22) Filed: Aug. 13, 2003

(65) Prior Publication Data

US 2004/0119424 A1 Jun. 24, 2004

Related U.S. Application Data

(60) Provisional application No. 60/404,022, filed on Aug. 16, 2002.

(51) Int. Cl.
*H05B 37/02* (2006.01)

(52) U.S. Cl. .................................. 315/308; 315/DIG. 4
(58) Field of Classification Search ................. 315/291, 315/299, 307–308, DIG. 4, DIG. 5
See application file for complete search history.

(56) References Cited

U.S. PATENT DOCUMENTS 5,798,616 A * 8/1998 Takehara et al. ............ 315/247

| | | | | |
|---|---|---|---|---|
| 6,486,616 B1 * | 11/2002 | Liu et al. | ..................... | 315/291 |
| 6,538,395 B2 * | 3/2003 | Szabados | ..................... | 315/291 |
| 6,603,274 B2 * | 8/2003 | Ribarich et al. | ............. | 315/291 |
| 6,639,367 B2 * | 10/2003 | Wells et al. | ................. | 315/224 |
| 6,642,669 B1 * | 11/2003 | MacAdam et al. | ......... | 315/244 |
| 6,674,248 B2 * | 1/2004 | Newman et al. | ............. | 315/247 |
| 6,784,622 B2 * | 8/2004 | Newman et al. | ............. | 315/219 |

OTHER PUBLICATIONS

Data Sheet No. PD60194, "Dimming Ballast Control IC," International Rectifier, 2001, Oct. 10, 2001.

* cited by examiner

*Primary Examiner*—Thuy Vinh Tran
(74) *Attorney, Agent, or Firm*—Brooks Kushman P.C.

(57) ABSTRACT

A fluorescent lamp ballast control circuit includes a ballast controller IC for driving a fluorescent lamp in a half-bridged topology and a control circuit. The control circuit receives an input signal and provides an output signal to the ballast controller IC. The control circuit further receives a feedback signal indicative of the fluorescent lamp current. The control circuit output signal is based on the input signal and the feedback signal. The fluorescent lamp ballast control circuit is used in combination with a fluorescent lamp ballast.

8 Claims, 2 Drawing Sheets

FLUORESCENT LAMP BALLAST CONTROL CIRCUIT

CROSS-REFERENCE TO RELATED APPLICATION

This application claims the benefit of U.S. provisional application Ser. No. 60/404,022, filed Aug. 16, 2002.

BACKGROUND OF THE INVENTION

1. Field of the Invention

The present invention relates to fluorescent lamp ballast control circuits.

2. Background Art

The use of fluorescent lamps has become widespread. The typical fluorescent lamp is composed of a glass tube containing an inert gas and a small amount of mercury. Phosphor coats the inside of the glass tube, and each end of the glass tube includes an electrode. In operation, a ballast provides current to the electrodes. A traditional ballast is a special transformer that uses electromagnetic principles to generate operating and starting voltages for fluorescent lamps. An electronic ballast uses electronics to achieve the same result. In operation, electrons migrate across the length of the tube, and excite the mercury atoms which are in a gaseous state. The arc releases photons in the ultraviolet band. The photons excite the phosphors that coat the inside of the glass tube, and the phosphors emit visible light.

One type of electronic ballast employs a ballast control integrated circuit (IC) to drive the fluorescent lamp. A ballast controller and half-bridge driver in one IC are described in Data Sheet No. PD60194, "DIMMING BALLAST CONTROL IC."

SUMMARY OF THE INVENTION

This circuit is used to enhance the performance of fluorescent ballast designs based on a half-bridge topology, employing a ballast controller IC. The addition of a current feedback control loop to the circuit provides the following improvements to ballast operation:

1. Tighter load regulation;
2. Improved load regulation over temperature;
3. Eliminates the need for trimming adjustments during ballast production;
4. Allows a single ballast to operate several lamp loads without changing the resonant L and C values, or readjusting the ballast (universal ballast operation); and
5. Analog control loop design provides a low cost solution for step dim or continuous dim applications.

In carrying out the present invention, a fluorescent lamp ballast control circuit is provided. The control circuit comprises a ballast controller IC for driving a fluorescent lamp in a half-bridge topology, and a control circuit. The control circuit receives an input signal and provides an output signal to the ballast controller IC. The control circuit further receives a feedback signal indicative of the fluorescent lamp current. The control circuit output signal is based on the input signal and the feedback signal.

At a more detailed level, the invention comprehends basing the control circuit output signal in part on a feed forward of the input signal and in part on an error determined by comparing the input signal to the feedback signal. Further, the output signal may be implemented as a weighted sum of the feed forward and the error. More specifically, in the preferred implementation, the weighted sum is composed of a greater weighting of the feed forward and a lesser weighting of the error. In a suitable application, the output signal is about 80% based on the feed forward and is about 20% based on the error.

Further, in carrying out the invention, the control circuit including a ballast controller IC for driving a fluorescent lamp in a half-bridge topology and a control circuit are provided in combination with a fluorescent lamp ballast. The control circuit employs various features described above.

DETAILED DESCRIPTION OF THE PREFERRED EMBODIMENT

Figure 1A:
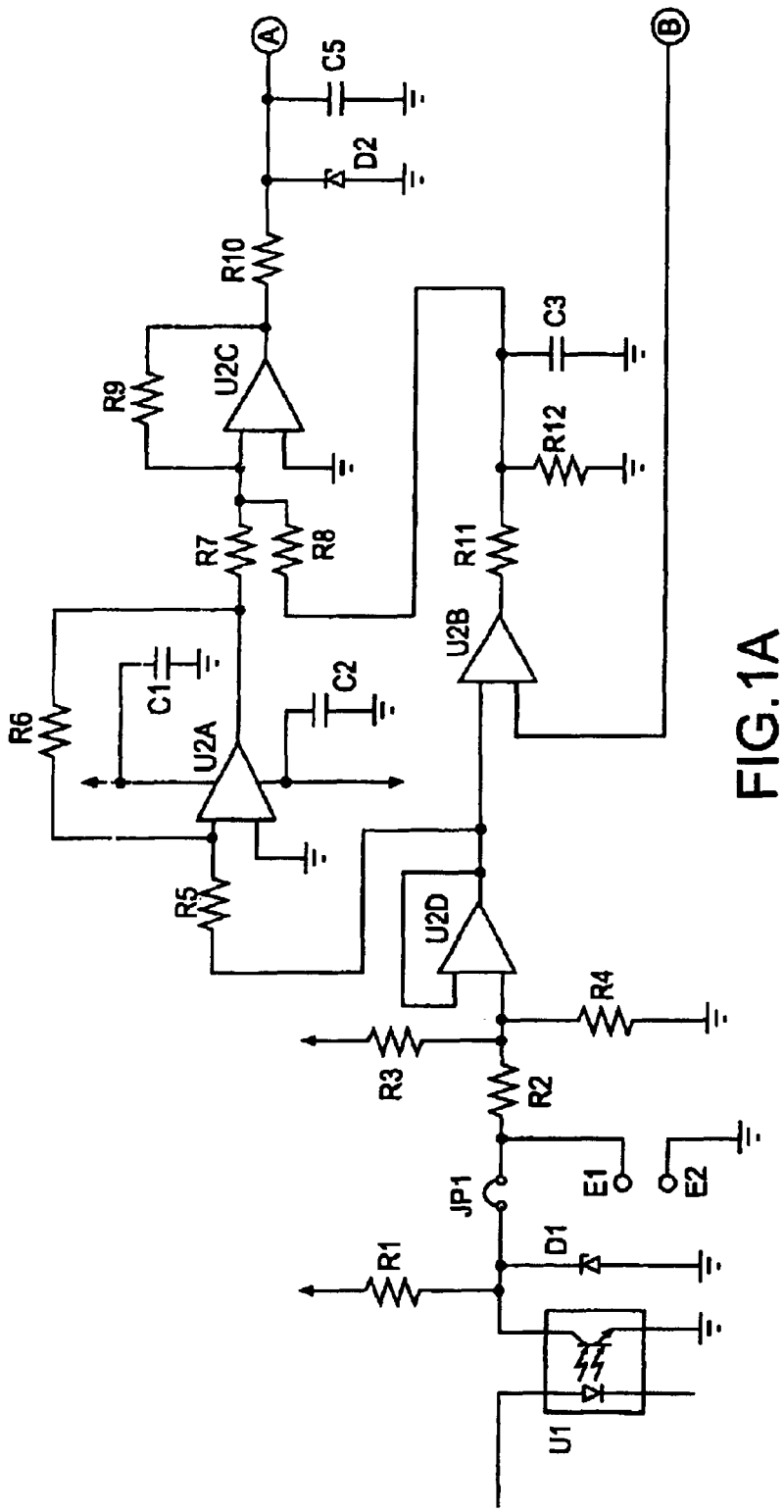
FIGS. 1A–1B are a schematic view of the circuit in the present invention
Figure 1B:
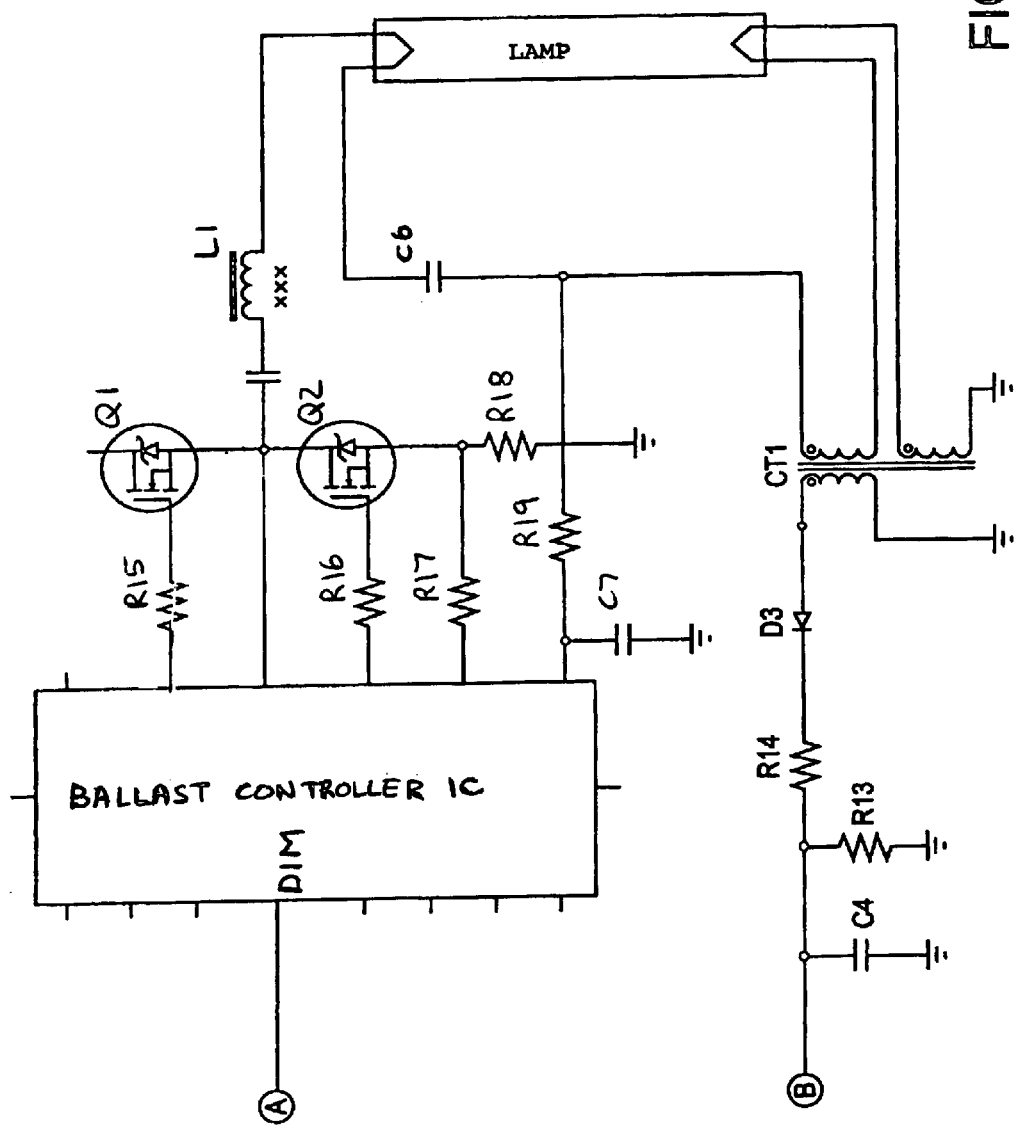

With reference to FIGS. 1A–1B, a current transformer, CT1 is placed in series with the lamp load to convert the lamp current to a proportional voltage. In the example illustrated, the ballast is designed to provide a step dim response of the lamp current with a dim current level of 50 mA and bright current level of 200 mA. The DC voltage developed from the CT network, composed of CT1, D3, R13, R14 and C4, is 0.74 VDC for a lamp current of 50 mA (dim) and 2.85 VDC for a lamp current of 200 mA (bright).

A voltage divider network, composed of R1, D1, R2, R3 and R4, is used to adjust either a step control signal or a variable control voltage so that the voltage is equivalent to the CT network output voltage. This command voltage is buffered by U2D.

The bulk of the command voltage, approximately 80%, is passed directly to the dim control input of the ballast controller IC. In this fashion, the ballast controller IC will respond rapidly to either step or variable command voltages and then, will be gradually adjusted to the desired current set point by an additional error voltage signal, representing the remaining 20% of the control signal. The error voltage is proportional to the deviation in lamp current from the desired set point.

The buffered command voltage is amplified by U2A, an inverting op amp configuration and converted from a range of 0.74 to 2.85 VDC, to a range of −1 to −4 VDC. Op amp U2A is configured with resistors R5, R6 and capacitors C1, C2. This voltage is passed through an inverting, unity gain summing amplifier, U2C, to the ballast controller IC. In the example illustrated, a IR21592 ballast controller IC has been employed, which responds to a dim control voltage in the range of 0.5 to 5 VDC. The minimum and maximum values of the controller IC have been adjusted so that with a 1 volt dim control signal, the ballast will attempt to regulate lamp current at 50 mA (dim) and with a 4 volt dim control signal, the ballast will attempt to regulate lamp current at 200 mA (bright).

The buffered command voltage is also applied as a reference to comparator U2B. As the voltage from the CT network, applied to the other lead of the comparator, either exceeds or falls below the reference established by the command voltage, the comparator output will either switch to the high or low rail. During normal operation, the output of the comparator is switching continuously back and forth between the high and low rail, as the lamp current varies away from the commanded lamp current. The varying comparator output is reduced in amplitude by a voltage divider consisting of R11 and R12 and is filtered to a DC error voltage by capacitor C3. The error voltage is then summed together with the bulk of the command voltage by summing amplifier U2C. Op amp U2C is configured with input resistors R7, R8, and feedback resistor R9. The output of op amp U2C is connected through R10, D2 and C5 to the ballast controller IC. The use of a bipolar supply allows the error voltage to either subtract or add to the command voltage as required to keep the lamp current at the required setting.

The ballast controller IC drives the lamp using a half-bridge topology. FIG. 1B illustrates a suitable half-bridge topology composed of R15, R16, R17, R18, R19, C6, C7, Q1, Q2, and L1. In operation, the ballast controller IC drives the lamp based on the control circuit output signal applied to the dim control input.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fluorescent lamp ballast control circuit comprising:
    a ballast controller IC for driving a fluorescent lamp in a half-bridge topology, the ballast controller IC having a dim control input; and
    a control circuit receiving an input signal and providing an output signal to the ballast controller IC dim control input, the control circuit further receiving a feedback signal indicative of a fluorescent lamp current, wherein the control circuit output signal is based on the control circuit input signal and the feedback signal to set and keep the lamp current at a desired setting based on the control circuit input signal;
    wherein the control circuit output signal is based in part on a feed forward of the control circuit input signal and based in part on an error determined by comparing the control circuit input signal to the feedback signal.

2. A fluorescent lamp ballast control circuit comprising:
    a ballast controller IC for driving a fluorescent lamp in a half-bridge topology; and
    a control circuit receiving an input signal and providing an output signal to the ballast controller IC, the control circuit further receiving a feedback signal indicative of a fluorescent lamp current, wherein the control circuit output signal is based on the input signal and the feedback signal;
    wherein the control circuit output signal is based in part on a feed forward of the input signal and based in part on an error determined by comparing the input signal to the feedback signal;
    wherein the output signal is based on a weighted sum of the feed forward and the error.

3. The fluorescent lamp ballast control circuit of claim 2 wherein the weighted sum is composed of a greater weighting of the feed forward and a lesser weighting of the error.

4. The fluorescent lamp ballast control circuit of claim 3 wherein the output signal is about 80% based on the feed forward and is about 20% based on the error.

5. In combination with a fluorescent lamp ballast, the improvement comprising:
    a ballast control circuit including a ballast controller IC for driving a fluorescent lamp in a half-bridge topology, the ballast controller IC having a dim control input and a control circuit receiving an input signal and providing an output signal to the ballast controller IC dim control input, the control circuit further receiving a feedback signal indicative of a fluorescent lamp current, wherein the control circuit output signal is based on the control circuit input signal and the feedback signal to set and keep the lamp current at a desired setting based on the control circuit input signal;
    wherein the control circuit output signal is based in part on a feed forward of the control circuit input signal and based in part on an error determined by comparing the control circuit input signal to the feedback signal.

6. In combination with a fluorescent lamp ballast, the improvement comprising:
    a ballast control circuit including a ballast controller IC for driving a fluorescent lamp in a half-bridge topology, and a control circuit receiving an input signal and providing an output signal to the ballast controller IC, the control circuit further receiving a feedback signal indicative of a fluorescent lamp current, wherein the control circuit output signal is based on the input signal and the feedback signal;
    wherein the control circuit output signal is based in part on a feed forward of the input signal and based in part on an error determined by comparing the input signal to the feedback signal;
    wherein the output signal is based on a weighted sum of the feed forward and the error.

7. The combination of claim 6 wherein the weighted sum is composed of a greater weighting of the feed forward and a lesser weighting of the error.

8. The combination of claim 7 wherein the output signal is about 80% based on the feed forward and is about 20% based on the error.

* * * * *